UNITED STATES PATENT OFFICE.

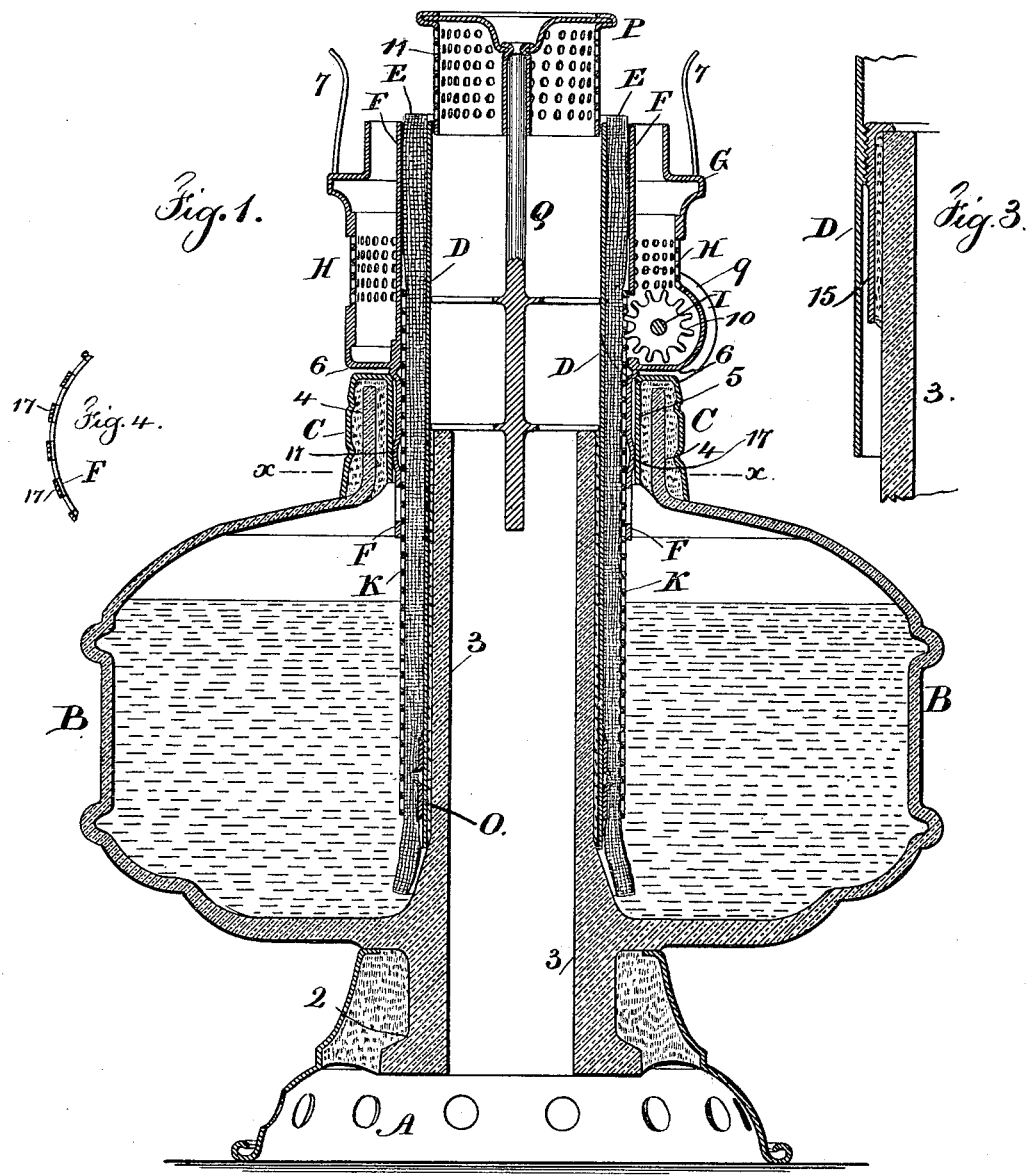
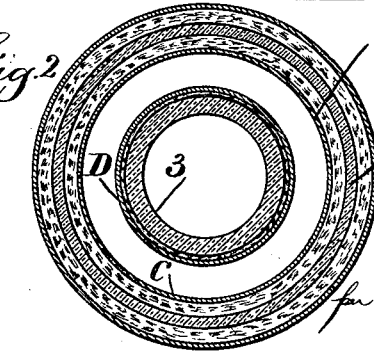

LEWIS J. ATWOOD, OF WATERBURY, CONNECTICUT, ASSIGNOR TO THE PLUME & ATWOOD MANUFACTURING COMPANY, OF SAME PLACE.

ARGAND LAMP.

SPECIFICATION forming part of Letters Patent No. 388,105, dated August 21, 1888.

Application filed January 16, 1888. Serial No. 260,810. (No model.)

*To all whom it may concern:*

Be it known that I, LEWIS J. ATWOOD, of Waterbury, in the county of New Haven and State of Connecticut, have invented an Improvement in Argand Lamps, of which the following is a specification.

Lamps have been made with a glass reservoir and with a glass tube passing up through the center of the same for the air that reaches the middle of the flame, and upon the top of this central glass air-tube a metallic burner has been rested; but in lamps of this character it is difficult to connect the burner to the glass of the reservoir or to use a cylindrical wick, because the air-tube has usually been conical or tapering, and the irregularities in the glass resulting from differences in the thickness have prevented the metal portions being connected directly to the glass, and there has always been difficulty in placing the exterior portions of the burner in their proper relative positions to the interior portions of the burner and affixing them to the respective portions of the glass fount and air-tube.

My improvements are made for obviating these difficulties, and consist in the combinations of devices hereinafter set forth.

In the drawings, Figure 1 is a vertical section of the fountain and burner complete. Fig. 2 is a sectional plan at the line $x\ x$ without the wick; and Fig. 3 is a section in larger size at one side of the air-tube, showing a modification in the manner of fastening the metal to the glass. Fig. 4 is a horizontal section through part of the slotted portion of the wick tube.

The base A of the lamp is usually of metal, and it may be of any desired shape or ornamental character, and the glass fountain B or reservoir is fastened to the base A by the short downwardly-projecting glass cylinder 2, that is united to the base by plaster or any suitable cement.

The reservoir B is of the desired external shape, and the air-tube 3 is of glass and made in one with the fountain, so as effectually to prevent any leakage, and this air-tube 3 extends as high, or nearly so, as the rim 4 for the sheet-metal collar C. This sheet-metal collar C is made double, the interior portion, 5, being cylindrical and either plain or formed with a screw-thread, and this cylinder passes down within the rim 4, and there is sufficient space between the collar and the glass rim for the collar to be properly placed in relation to the air-tube, and this is accomplished by the insertion of a cylindrical guide between the sheet-metal air-tube D and the collar C after the said air-tube D has been attached in place, so that the collar C may be secured in its proper position by plaster-of-paris introduced within such sheet-metal collar for attaching the same to the glass rim 4, and thereby the metal parts of the burner are sustained in their proper concentric relation to each other upon the glass reservoir.

The sheet-metal air-tube D is of a size to fit loosely around the glass air-tube 3, and it extends down into the reservoir, and is attached to the glass by plaster-of-paris or suitable cement, and the air-tube D, being, by preference, cylindrical, is adapted to receive around it the cylindrical or tubular wick E, and this sheet-metal air-tube D, extending down around the glass air-tube, cannot become loose around the same, because the connection is permanently made by cement; hence there is no risk of the metal parts of the burner becoming loose upon the glass, and any inaccuracies in the size and shape of the glass fount are compensated by the construction and mode of connection described.

The wick-tube F is of a size to fit into the interior of the sheet-metal collar C, and by preference this wick-tube F is slotted in the lower portion that passes through such collar C, and the metal between the slots is slightly bent outwardly, so as to form springs 17, that cause the necessary friction between the exterior of the wick-tube and the interior of the sheet-metal collar C, for retaining the wick-tube and the parts therewith connected when introduced vertically into the collar C.

The air-distributer H surrounds the wick-tube F at the proper distance therefrom, and the lower end thereof is made as an annular flange, 6, that is connected with the wick-tube F and rests upon the top of the collar C. The chimney-holder G is at the upper end of the air-distributer H, and it is provided with springs 7, and such chimney-holder is contracted so as to direct the external currents of air against the flame. The wick-tube F, chimney-holder G, and air-distributer H are made of separate pieces of metal and soldered together, so as to form practically one piece, and are thus shown in the drawings.

The wick-raiser shaft I passes through and is supported by the air-distributer H, and it is provided with a thumb-wheel, 9, at the outer end, and toothed wick-raisers 10 within the air-distributer and passing through a slot in the wick-tube. Around the wick is a rack-cylinder, K, that is formed of sheet metal, having perforations or slots which correspond to the teeth upon the wick-raiser wheels 10, and this rack-cylinder inclosing the wick becomes a guide to the same and causes it to move with accuracy either up or down upon the air-tube D by the action of the wick-raiser wheels 10 in the openings of such rack-cylinder, and this rack-cylinder is adapted to receive the teeth of the wick-raiser wheels at any place in its periphery.

There is a band, O, within the lower part of the Argand wick and outside of the air-tube D, which band is provided with projecting teeth to enter the wick and hold the same firmly against the interior of the rack-cylinder K.

It will be apparent that the sheet-metal air-tube D may be permanently connected to the cylindrical glass air-tube 3 in any suitable manner. There may be a sleeve or band, 15, within the sheet-metal air-tube D, as shown in larger size in Fig. 3, which sleeve or band is cemented firmly to the glass and the air-tube D slipped over the outside thereof tightly, and united thereto by a screw-thread upon the exterior of the sleeve and the interior of the air-tube. This, however, is not usually necessary. The deflector P, having a perforated skirt, 11, is supported by a central rod, Q, within the air-tube, as shown.

I claim as my invention—

1. In an Argand lamp, the combination, with the glass reservoir or oil-fount having a cylindrical or nearly cylindrical central glass air-tube integral therewith and extending to the top of the reservoir, or nearly so, of a sheet-metal air-tube surrounding the glass air-tube and extending down into the reservoir and firmly attached to such glass air-tube, so as to form an internal wick-tube and a guide for the wick, substantially as set forth.

2. The combination, in an Argand lamp, with the glass-reservoir having a central glass air-tube, 3, and a glass rim, 4, in one piece, of a sheet-metal air-tube, D, surrounding and secured to the glass air-tube 3 and extending down into the reservoir, and also above such air-tube 3, and the sheet-metal collar C, over the glass rim 4, and having an interior cylindrical portion, 5, that is concentric to and parallel with the sheet-metal air-tube D, the collar being secured to the glass rim 4, substantially as and for the purposes set forth.

3. The combination, in an Argand lamp, with the glass reservoir having an air-tube, 3, and rim 4, of a sheet-metal air-tube, D, surrounding and fastened to the air-tube 3, the sheet-metal collar C, having an internal cylinder, 5, that is concentric with the sheet-metal air-tube D, and is cemented to the rim 4, and the external wick-tube, F, passing down within the collar C, provided with slots and intervening springs to form a friction for retaining the parts in place, substantially as set forth.

4. The combination, in an Argand lamp, with the glass reservoir having a central glass air-tube, 3, and rim 4, of a sheet-metal air-tube, D, fastened to the air-tube 3 and extending downward in the reservoir, the collar C, having an internal cylinder, 5, and cemented to the rim 4, the wick-tube F, passing down within the collar C and extending up to the top of the wick-tube, or nearly so, the air-distributer, chimney-holder, and deflector, the wick-raiser supported by the air-distributer, and the rack-cylinder surrounding the wick and having perforations for the teeth of the wick-raiser, substantially as set forth.

5. The combination, in an Argand lamp, with the glass reservoir having a central glass air-tube and a rim around the upper end, of a collar cemented to the rim and having a cylindrical interior and a metal tube or band that is concentric with the collar and surrounds the glass air-tube of the reservoir and is permanently attached around the same, substantially as set forth.

6. The combination, in an Argand lamp, with the reservoir having central air-tube and rim all in one piece of glass, of a sheet-metal air-tube surrounding and fastened to the glass air-tube, a sheet-metal collar with an internal cylinder that is cemented to the glass rim and concentric with the sheet-metal air-tube, and the external wick-tube passing down within the collar, substantially as set forth.

7. The combination, in an Argand lamp, with the reservoir having a central air-tube and rim in one piece of glass, of a hollow metallic collar having a cylindrical interior and receiving the glass rim and cemented thereto, and a sheet-metal air-tube concentric with the collar and permanently affixed to the glass air-tube, substantially as set forth.

8. The combination, in an Argand lamp, with the glass reservoir having a central glass air-tube, 3, of a sheet-metal air-tube, D, extending down into the reservoir and fastened to such air-tube 3, and the sheet-metal collar C, having an interior cylindrical portion, 5, that is concentric to and parallel with the sheet-metal air-tube D, the collar being secured to the glass, substantially as set forth.

Signed by me this 11th day of January, 1888.

LEWIS J. ATWOOD.

Witnesses:
 GEO. T. PINCKNEY,
 WILLIAM G. MOTT.